June 6, 1933. E. REID 1,912,796
BRAKE MECHANISM
Filed June 15, 1928
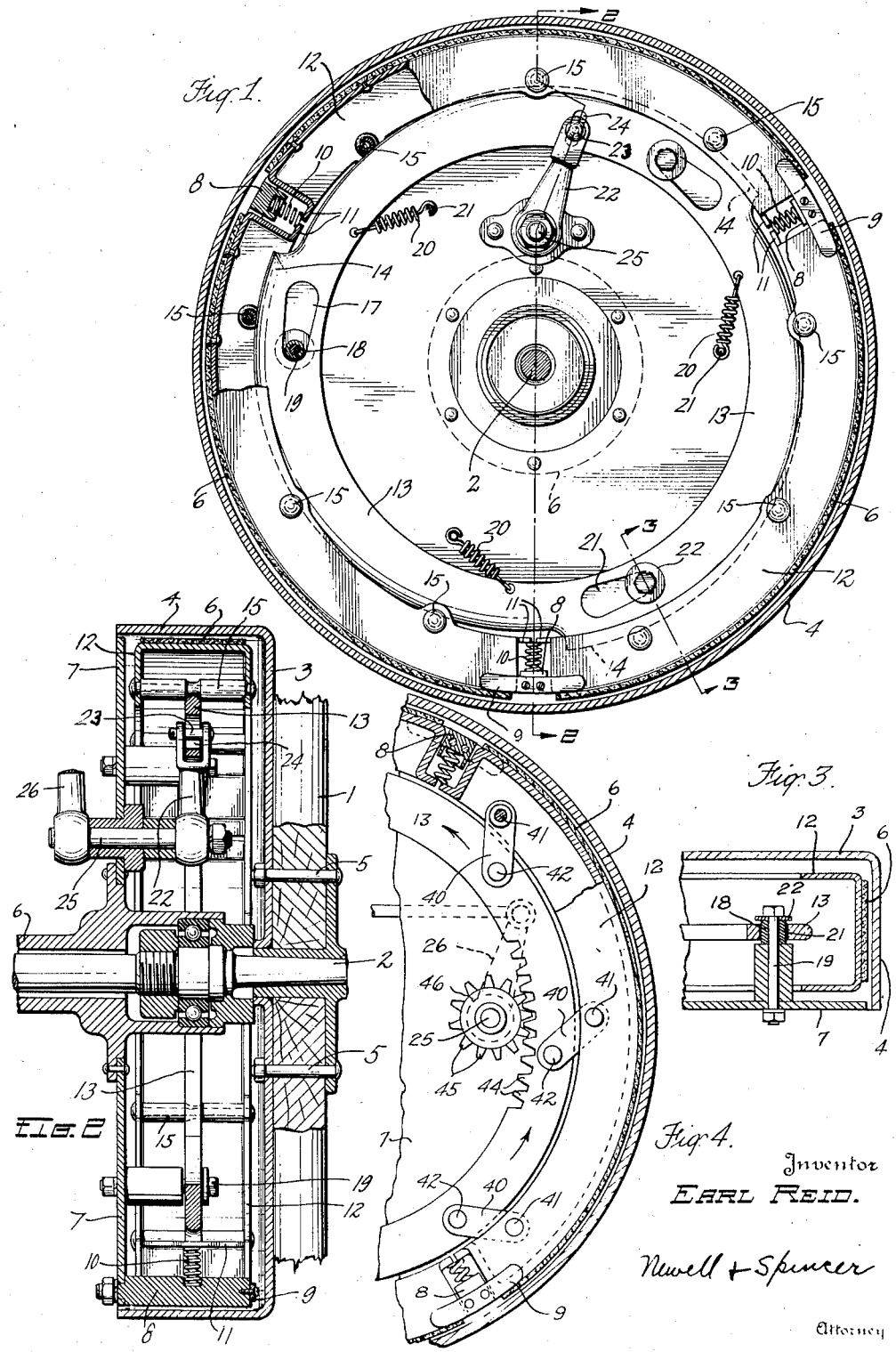
Inventor
EARL REID.
Newell + Spencer
Attorney Patented June 6, 1933

1,912,796

UNITED STATES PATENT OFFICE

EARL REID, OF CHICAGO, ILLINOIS, ASSIGNOR TO BENDIX BRAKE COMPANY, OF CHICAGO, ILLINOIS, A CORPORATION OF ILLINOIS

BRAKE MECHANISM

Application filed June 15, 1928. Serial No. 285,544.

This invention relates to brake mechanisms and particularly to brake mechanisms adapted to be applied to motor vehicles.

In certain types of brake mechanisms employed upon motor vehicles, such mechanisms comprise a plurality of brake members or brake shoes arranged to be brought into engagement with a relatively rotatable braking surface to retard the rotation of a vehicle wheel. In the operation of mechanisms of this type it often occurs that one of the brake shoes will be brought into contact with the braking surface in advance of one or more of the other shoes, with the result that the brake shoes are forced into engagement with the braking surface with unequal pressures. Also the portions of a brakeshoe upon opposite sides of the central plane of the shoe do not always lie at the same distances from the braking surfaces so that the two side portions will exert unequal pressures on the braking surface or one side of the brakeshoe will engage the braking surface while the other side of the shoe is disengaged from said surface. These defects impair the efficiency of the brake since they reduce the effective area of the contacting braking surfaces and also result in uneven wear upon the brakeshoes.

The principal object of the present invention is to improve the construction and mode of operation of brake mechanisms of the type in which a plurality of braking members or shoes are arranged to engage a braking surface with a view of obviating the disadvantages of prior constructions above pointed out.

With this and other objects in view, the invention comprises the novel and improved features, constructions and combinations of parts hereinafter described and particularly pointed out in the claims, the advantages of which will be readily understood and appreciated by those skilled in the art.

The invention will be more clearly understood by reference to the accompanying drawing which illustrates a preferred embodiment of the invention, and in which—

Figure 1 is a vertical sectional view of one type of brake mechanism embodying the present invention;

Figure 2 is a sectional view of the mechanism shown in Figure 1 taken on the line 2—2;

Figure 3 is a detailed view of a portion of the mechanism taken on the line 3—3 of Figure 1; and Figure 4 is a sectional view similar to Figure 1 illustrating a modified form of the invention.

The invention is shown by way of illustration as applied to the wheel of a motor vehicle, in which the vehicle wheel 1 is secured to the axle 2 of the vehicle and is provided with a brake drum 3 having an inwardly-extending annular flange 4 forming a braking surface against the inner surface of which the brake shoes may bear to retard the rotation of the wheel. The brake drum is secured to the wheel by means of bolts 5 so as to rotate with the wheel. The axle 2 to which the wheel is secured extends through an axle housing 6 to which a circular plate 7 is fixed so as to cooperate with the inturned flange 4 of the brake drum 3 to enclose the brake shoes and the brake-operating mechanism. Blocks 8 are bolted to the plate 7 near its outer edge and are positioned between the brake shoes for preventing the rotation of the shoes with the brake drum when the brake is applied. These blocks carry plates 9 at their outer ends for limiting the lateral movement of the brake shoes toward the vehicle wheel and are also provided with springs 10 for engaging projections 11 on the ends of the brake shoes to retract the brake shoes from engagement with the braking surface when the brake is released.

The brake shoes 12 are positioned within the brake drum and when retracted are spaced inwardly from the annular flange 4 with which the outer or engaging surface of the brake shoes engage when the brake is applied. The brake shoes are forced outwardly into engagement with the braking surface to apply the brake, by means of a floating cam ring 13 upon the periphery of which are formed cams 14. The brake shoes 12 are provided with rollers or cross bars 15 near their inner edge which rest upon the cams 14 so as to force the brake shoes outwardly when the cam ring is rotated in a counter-clockwise direction, as seen in Figure 1. The rollers 15 are grooved at their mid points 16 where they engage the cam ring 13 and are spaced at different distances from the outer or engaging surface of the brake shoes 12 so that when the cam ring is rotated the entire length of the engaging surface of each brake shoe will be brought into braking engagement with the braking surface provided by the annular flange 4.

In order that the braking force may be applied substantially equally and simultaneously to all of the brake shoes the cam ring 13 is permitted to move a limited distance with reference to the axis of rotation of the wheel. This movement of the cam ring 13 is permitted by providing tapered slots 17 in the cam ring 13, through which bolts 19 carrying the rollers 18 extend. The bolts 19 are secured to the stationary plate 7 and the rollers 18 limit the movement of the cam ring. Since the slots 17 are wider at their large ends than the rollers 18 the cam ring is free to move with reference to the rollers and with reference to the axis of rotation of the wheel when the ring has been rotated in a counter-clockwise direction, as seen in Figure 1, so as to bring the enlarged ends of the slots 17 opposite the rollers 18.

The cam ring is urged in clockwise direction to the position in Figure 1 by the springs 20 secured to cam ring 13 and to the stationary bolts 21 carried by the plate 7. In this way the cam ring is normally held with the rollers 18 in the small end of the tapered slots so that the ring will not rattle and the brake shoes may be retracted by the springs 10.

The braking action of the brake shoes will be most efficient when the entire width of the engaging surface of each brake shoe is brought into engagement with the braking surface under substantially the same pressure. In order to bring those portions of the brake shoe upon the opposite sides of the central plane of the shoe into engagement with the braking surface so as to effect the most efficient braking action, the brake shoes 12 are tiltable about the periphery of the cam ring 13 so as to bring the entire width of the engaging surface of the brake shoe into engagement with the braking surface. Thus, if one side of the brake shoe should engage the braking surface before the other side of the brake shoe or if the pressure applied to one side of the brake shoe should be different from that applied to the other side of the brake shoe, the shoe will tilt about the periphery of the cam ring and bring the entire width of the shoe into engagement with the braking surface under substantially the same pressure.

The cam ring is rotated to actuate the brake and to force the brake shoes outwardly into engagement with the braking surface by means of an operating lever 22 secured to the shaft 25 which extends through the stationary plate 7. The operating lever is provided at its outer end with a pin 23 extending through the elongated slot 24 in the cam ring 13. The operating lever is rotated about the axis of the shaft 25 to operate the brake by means of the actuating arm 26 secured to the outer end of the shaft 25.

The actuating arm 26 may be rotated in any convenient manner to operate the brake. When the actuating arm 26 is so moved the lever 22 is rotated so as to rotate the cam ring 13 in counter-clockwise direction to force the brake shoes radially into engagement with the braking surface. If one of the brake shoes should engage the braking surface before one or more of the other brake shoes has engaged the braking surface the cam ring 13 will continue to rotate but will be moved away from the brake shoe which is already engaged and its axis of rotation will shift with reference to the axle of the wheel until all of the other brake shoes have been brought into engagement with the braking surface and it is not until the entire engaging surface of each of the brake shoes is brought into engagement with the braking surface that the actual braking force is applied to retard the rotation of the wheel.

In the modified form of the invention illustrated in Figure 4, the brake shoes 12 are secured to the floating ring 13 by means of links 40. The outer end of each link is secured to the brake shoe by the bolt pin 41 and the inner end of each link is secured to the floating ring by the bolt or pin 42. In the operation of this form of the invention the floating ring 13 is rotated by any suitable means in the direction of the arrow shown in Figure 4, to apply the brake. The brake shoes 12 are prevented from rotation by the blocks 8 carried by the stationary plate 7. When the ring 13 is rotated the links 40 tend to move to a position normal to the periphery of the floating ring and the brake shoes are thus forced radially into engagement with the braking surface.

If one of the brake shoes should engage the braking surface before one or more of the other brake shoes the ring 13 will shift laterally, displacing its axis of rotation and bringing the other brake shoes into engagement with the braking surface. It is not until all of the brake shoes are in engagement with the braking surface that the actual braking force is applied.

The bolts 41 and 42 which secure the links 40 to the brake shoes 12 and floating ring 13 respectively, are preferably sufficiently loose to permit limited movement of the brake shoes transversely to the ring 13 so that the engaging surfaces of the brake shoes will take up a position parallel with the braking surface so as to bring the entire surfaces of the brake shoes into engagement with the braking surface.

The means shown in this form of the invention for effecting rotation of the floating ring 13 consists of teeth 44 formed on the inner edge of the ring 13 which engage with teeth 45 of the pinion 46. The pinion 46 is secured to the shaft 25 and may be rotated by the actuating arm 26 to rotate the floating ring 13 and apply the brake. The teeth 44 of the floating ring 13 and the teeth 45 of the pinion 46 are sufficiently long to permit movement of the ring 13 relatively to the pinion 46 so as to bring all of the brake shoes into engagement with the braking surface before the braking force is applied to retard the rotation of the wheel.

Although the invention has been described in certain specific forms it will be clear that other constructions and arrangements of the mechanism may be employed and it is not intended that the invention should be limited to the constructions shown by way of illustration except as defined by the claims.

What is claimed as new is:

1. A brake comprising in combination, a braking surface, a plurality of braking members and means for forcing said members into engagement with the braking surface so that all parts of each member will act equally to apply substantially the same frictional force to said surface, together with means for positively determining the released positions of the braking members and said forcing means.

2. A brake comprising in combination, a plurality of braking members, a surface to be engaged thereby, and means floating with respect to said members, for distributing the braking force applied to said braking members equally among all of said members, the released position of said floating member being positively determined.

3. A brake comprising in combination, a plurality of braking members, cams for moving said braking members into braking position, and means for forcing each of said cams into engagement with said braking members with substantially the same force, the released position of said floating member being positively determined.

4. A brake comprising in combination, a movable member, a stationary member, braking members carried by said stationary member, operating means for moving said braking members into engagement with said movable member, said operating means being rotatable about the axis of the movable member, said operating means being free to float when the brake is applied and held against floating when the brake is released.

5. A brake comprising in combination, braking members, a surface to be engaged by said braking members, a ring member provided with cams on its periphery, means for moving said ring member about its axis, said ring member being movable during the braking operation to alter the position of its axis and having its axis fixed when the brake is released.

6. A brake comprising in combination, braking members, a surface to be engaged by said braking members, a circular member provided with cams upon its outer edge and having tapered slots therein adjacent its outer edge, and means passing through the slots in said circular member and engaging said braking members.

7. A brake comprising in combination, a brake drum, a plurality of shiftable-anchorage brake shoes, a rotatable brake shoe actuating ring, means for rotating the ring to apply the brake shoes to said drum, means for supporting the ring to permit the ring to shift transversely of its axis of rotation to bring the several brake shoes into engagement with the brake drum with substantially the same braking force and for positively determining the position of the ring when the brake is released.

Signed at New York, N. Y., this 26th day of May, 1928.

EARL REID.